United States Patent
Shams et al.

(10) Patent No.: US 7,962,252 B2
(45) Date of Patent: Jun. 14, 2011

(54) SELF-CONTAINED AVIONICS SENSING AND FLIGHT CONTROL SYSTEM FOR SMALL UNMANNED AERIAL VEHICLE

(75) Inventors: Qamar A. Shams, Yorktown, VA (US); Michael J. Logan, Chesapeake, VA (US); Robert L. Fox, Hayes, VA (US); Christopher L. Fox, legal representative, Yorktown, VA (US); Melanie L. Fox, legal representative, Hayes, VA (US); John C. Ingham, Alexandria, VA (US); Sean A. Laughter, Chester, VA (US); Theodore R. Kuhn, III, Fredericksburg, VA (US); James K. Adams, Gloucester, VA (US); Walter C. Babel, III, Smithfield, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 585 days.

(21) Appl. No.: 11/422,984

(22) Filed: Jun. 8, 2006
(Under 37 CFR 1.47)

(65) Prior Publication Data
US 2007/0069083 A1    Mar. 29, 2007

Related U.S. Application Data

(60) Provisional application No. 60/692,712, filed on Jun. 20, 2005.

(51) Int. Cl.
*G01C 23/00* (2006.01)
(52) U.S. Cl. .......... 701/3; 701/4; 701/11; 701/23; 701/120; 348/148; 348/119; 348/143; 382/291; 382/103; 382/104; 382/116; 708/235; 345/601

(58) Field of Classification Search .......... 701/2, 24, 701/120, 23, 206, 11, 301, 3, 4; 244/189; 348/148, 119, 143; 382/291, 103, 104, 116; 345/601; 708/235
See application file for complete search history.

(56) References Cited

U.S. PATENT DOCUMENTS

| | | | | |
|---|---|---|---|---|
| 5,581,250 A | * | 12/1996 | Khvilivitzky | 340/961 |
| 5,904,724 A | * | 5/1999 | Margolin | 701/120 |
| 6,023,061 A | | 2/2000 | Bodkin | |
| 6,085,127 A | | 7/2000 | Vos | |
| 6,122,572 A | | 9/2000 | Yavnai | |
| 6,140,958 A | | 10/2000 | Johnson et al. | |

(Continued)

*Primary Examiner* — Tuan C To
*Assistant Examiner* — Redhwan Mawari
(74) *Attorney, Agent, or Firm* — Andrea Z. Warmbier; Helen M. Galus

(57) ABSTRACT

A self-contained avionics sensing and flight control system is provided for an unmanned aerial vehicle (UAV). The system includes sensors for sensing flight control parameters and surveillance parameters, and a Global Positioning System (GPS) receiver. Flight control parameters and location signals are processed to generate flight control signals. A Field Programmable Gate Array (FPGA) is configured to provide a look-up table storing sets of values with each set being associated with a servo mechanism mounted on the UAV and with each value in each set indicating a unique duty cycle for the servo mechanism associated therewith. Each value in each set is further indexed to a bit position indicative of a unique percentage of a maximum duty cycle for the servo mechanism associated therewith. The FPGA is further configured to provide a plurality of pulse width modulation (PWM) generators coupled to the look-up table. Each PWM generator is associated with and adapted to be coupled to one of the servo mechanisms.

7 Claims, 2 Drawing Sheets

U.S. PATENT DOCUMENTS

| | | |
|---|---|---|
| 6,208,936 B1 | 3/2001 | Minor et al. |
| 6,539,290 B1 | 3/2003 | Vos |
| 6,584,382 B2 | 6/2003 | Karem |
| 6,694,228 B2 | 2/2004 | Rios |
| 6,710,567 B2 * | 3/2004 | Heydt et al. ................ 318/560 |
| 6,711,477 B1 | 3/2004 | Johnson et al. |
| 6,856,894 B1 | 2/2005 | Bodin et al. |
| 6,859,729 B2 | 2/2005 | Breakfield et al. |
| 6,873,886 B1 | 3/2005 | Mullen et al. |
| 6,925,382 B2 | 8/2005 | Lahn |
| 6,948,681 B2 | 9/2005 | Stupakis |
| 2003/0009270 A1 * | 1/2003 | Breed ............................ 701/29 |

* cited by examiner

SELF-CONTAINED AVIONICS SENSING AND FLIGHT CONTROL SYSTEM FOR SMALL UNMANNED AERIAL VEHICLE

CLAIM OF BENEFIT OF PROVISIONAL APPLICATION

Pursuant to 35 U.S.C. §119, the benefit of priority from provisional application 60/692,712, with a filing date of Jun. 20, 2005, is claimed for this non-provisional application.

ORIGIN OF THE INVENTION

The invention was made in part by employees of the United States Government and may be manufactured and used by or for the Government of the United States of America for governmental purposes without the payment of any royalties thereon or therefor.

BACKGROUND OF THE INVENTION

1. Field of the Invention

This invention relates to unmanned aerial vehicles. More specifically, the invention is a self-contained avionics sensing and flight control system for use onboard a variety of small unmanned aerial vehicles.

2. Description of the Related Art

The "unmanned aerial vehicle" (UAV) is rapidly gaining prominence in the fields of intelligence gathering, surveillance, and/or reconnaissance. In each of these applications, the UAV must be properly equipped for flight and sensing operations to suit a particular application. For larger UAVs (e.g., on the order of hundreds or thousands of pounds), a variety of flight control systems and sensor suites are readily available as size/weight/cost constraints of these items/systems are not of paramount concern. However, as the demand increases for small UAVs (e.g., sometimes with wingspans on the order of 6 inches and weighing less than one pound), there is a need to provide flight control and sensing systems commensurate in scale with the size/weight/cost of the UAV structures.

SUMMARY OF THE INVENTION

Accordingly, it is an object of the present invention to provide avionic sensing and flight control system for use on small UAVs. Other objects and advantages of the present invention wilt become more obvious hereinafter in the specification and drawings.

In accordance with the present invention, a self-contained avionics sensing and flight control system is provided. The system is adapted to be mounted on one or more circuit boards that are installed on an unmanned aerial vehicle (UAV). In terms of sensing, the system includes sensors for sensing flight control and surveillance parameters, and a Global Positioning System (GPS) receiver for providing signals indicative of location. The flight control parameters and signals indicative of location are processed by a controller to generate flight control signals. A Field Programmable Gate Array (FPGA) coupled to the controller is configured to provide a look-up table storing sets of values with each set being associated with a servo mechanism mounted on the UAV and with each value in each set indicating a unique duty cycle for the servo mechanism associated therewith. Each value in each set is further indexed to a bit position indicative of a unique percentage of a maximum duty cycle for the servo mechanism associated therewith. The FPGA is further configured to provide a plurality of pulse width modulation (PWM) generators coupled to the look-up table. Each PWM generator is associated with and adapted to be coupled to one of the servo mechanisms. Each flight control signal from the controller specifies one of the bit positions. Then, the one PWM generator so-specified outputs a PWM signal having a duty cycle dictated by the one value in the one set stored at the one bit position so-specified.

DETAILED DESCRIPTION OF THE INVENTION

Figure 1:
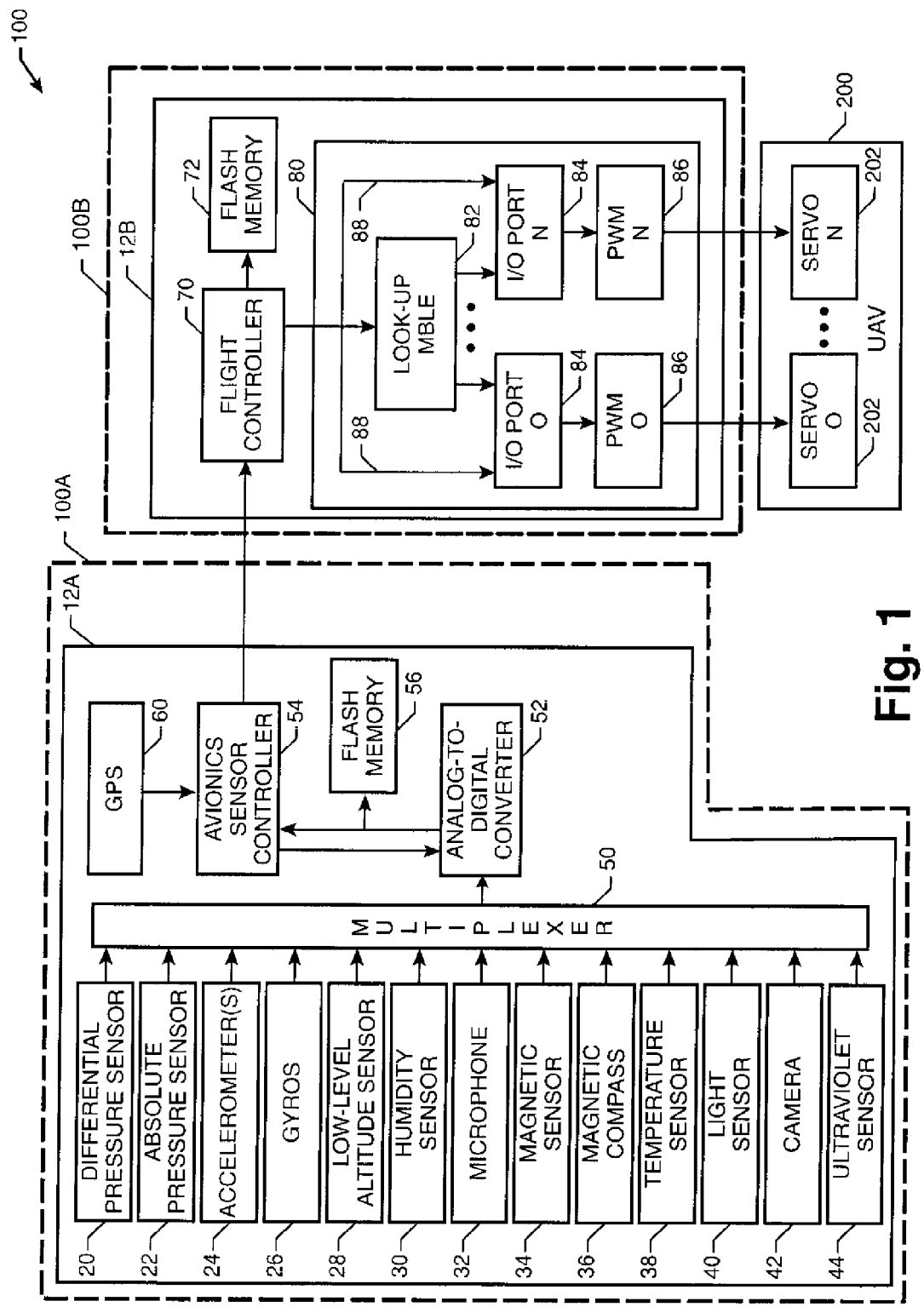
FIG. 1 is a block diagram of an avionics sensing and flight control system for an unmanned aerial vehicle (UAV) in accordance with an embodiment of the present invention.

Referring now to the drawings and more particularly to FIG. 1, an avionics sensing and flight control system for use with a small unmanned aerial vehicle (UAV) 200 in accordance with the present invention is shown and is referenced generally by numeral 100. The sensing aspects of system 100 are indicated generally by numeral 100A and the flight control aspects are indicated generally by numeral 100B. Delineating the functions of system 100 in this way provides a design that permits usage of just sensing aspects 100A when a UAV is already equipped with a flight control system. However, for purposes of the present description, it will be assumed that both sensing aspects 100A and flight control aspects 100B are incorporated in system 100.

As will be explained further below, system 100 is designed for use onboard a variety of small UAVs where "small" can be defined to include UAVs having wingspans on the order of six inches and/or weighing less than one pound. That is, the elements used in system 100 as well as the system configuration provide a small form-factor design. While this is the great advantage of the present invention, it is to be understood that the present invention could also be used on larger UAVs.

In the illustrated embodiment, sensing aspects 100A utilize a variety of sensors and support circuitry mounted on a single circuit board 12A, while the elements of flight control aspects 100B are mounted on a separate circuit board 12B. Note that while the use of two circuit boards provides additional flexibility, it is also possible to use a single circuit board for both sensing aspects 100A and flight control aspects 100B. Still further, the sensors could be distributed about/on the UAV for an application requiring more customization.

Sensing aspects 100A includes sensors that sense parameters used in flight control and various surveillance parameters required by a particular mission. In terms of flight control parameters, system 100 includes a differential pressure sensor 20 for measuring airspeed, an absolute pressure sensor 22 for measuring altitude, accelerometer(s) 24 for measuring acceleration in three-dimensions, and orthogonally-oriented gyros 26 for measuring pitch, roll and yaw rates. To satisfy small form-factor system requirements, "micro-electro-mechanical systems" (MEMS) devices are preferably used to realize the various flight control sensing devices. The MEMS-based devices are commercially available single chip devices that lend themselves to easy integration onto circuit board 12A. Power for these devices can come from a battery (not shown). However, since MEMS devices generally require low voltages, power could also come from solar cells (not shown) mounted on the UAV.

Accelerometer(s) 24 measures acceleration in each of three mutually orthogonal axes. Accordingly, accelerometers 24 could be realized by a single triaxial accelerometer, three single-axis accelerometers appropriately oriented, or one single-axis accelerometer and one two-axis accelerometer. MEMS-based devices can be used in each instance. Gyros 26 can also be MEMS-based devices or can be piezoelectric-based devices. When using a MEMS-based gyro, the gyro's mass is constrained such that it can only resonate in one direction.

Absolute pressure sensor 22 uses the absolute pressure of ambient air as the means to reliably indicate altitude as is well known in the art. However, MEMS-based absolute pressure sensors are most reliable at altitudes higher than ten feet. Accordingly, in order for system 100 to be able to control flight near the ground, a reliable low-level altitude sensor 28 can be provided. Such low-level altitude sensing can be achieved using an ultrasonic transducer. In such a case, the output of altitude sensor 28 is used during take-off and landing whereas the output of pressure sensor 22 is used when altitude is greater than approximately ten feet.

As mentioned above, sensing aspects 100A of system 100 include the capability to sense/monitor a variety of environmental and/or visual conditions during the UAV's flight. Generally, these conditions will be critical to the UAV's surveillance mission which can include intelligence gathering, reconnaissance, etc. Such sensing/monitoring devices include, but are not limited to the following:

- a humidity sensor 30 (e.g., a commercially available hydrothermal MEMS chip utilizing shear stress/strain technology),
- a microphone 32 (e.g., a commercially-available MEMS chip having an omni-directional sensitivity),
- a magnetic sensor 34 for detecting the earth's magnetic field component that is parallel to the earth's surface as a means for determining compass direction,
- a magnetic compass 36 (e.g., a commercially-available three-axis tilt-compensated device that uses a two-axis accelerometer to enhance performance),
- a temperature sensor 38,
- a light sensor 40 (e.g., a cadmium sulphide logarithmic sensor),
- a camera 42 (e.g., a small infrared camera for night reconnaissance), and
- an ultraviolet sensor 44.

Obviously, particular types of surveillance sensors could be omitted or provided in multiples thereof depending on mission requirements.

The analog outputs from the above-described flight control and surveillance sensors are multiplexed at a multiplexer 50 and then digitized at an analog-to-digital converter 52. Control of the multiplexing and digitizing operations is governed by an avionics sensor controller 54. The output of analog-to-digital converter 52 is raw, digitized samples of data (e.g., in a "serial peripheral interface" (SPI) protocol). While this data format has no start/stop bits or identifiers, it may still be suitable for archival storage on a flash memory 56. The stored data could then be downloaded to a computer after the UAV's mission.

Controller 54 generates data packages using the raw data (output from analog-to-digital converter 52) into a format for use in flight control aspects 100B. The channel of multiplexer 50 is used to identify the data type (e.g., absolute pressure, humidity, etc.). Each data package is provided with a header, start/stop bits, etc., (as would be understood in the art), and contains sensed information that is either (i) used for flight control, or (ii) comprises a piece of surveillance information.

The data can be provided to flight control aspects 100B in some standard transmission/reception format (e.g., a Universal Asynchronous Receiver/Transmitter or "UART" transmission format). In addition, controller 54 could convert the packaged data into a format (e.g., RS232 serial) for direct output to a conventional personal computer. This option is useful for ground testing of system 100.

Sensing aspects 100A also includes a Global Positioning System (GPS) receiver module 60 that will output a serial stream of location data in the industry standard National Marine Electronics Association (NMEA) protocol. This data stream is in UART form and is, therefore, ready for re-transmission to flight control aspects 100B by controller 54. Note that the GPS data could also be made available as a conventional serial (e.g., RS232) output.

Each data package (i.e., a flight control parameter data package, surveillance parameter data package, or GPS location data package) is provided to flight control aspects 100B. More specifically, a flight controller 70 receives the data packages. The surveillance parameter data packages are stored in a flash memory 72 coupled to flight controller 70. Note that if the surveillance data was already stored in its raw form in flash memory 56, flash memory 72 may not be needed for this purpose.

The GPS location data packages and the flight control parameter data packages are processed by flight controller 70 to generate flight control signals used for in-flight control of UAV 200. If system 100 is to be used for fully autonomous flight control, flash memory 72 can be used to store flight patterns, lists of way points, etc., used by flight controller 70 in conjunction with the sensed flight control parameters to develop flight control signals. In general, UAV 200 is equipped with a number of controllable surfaces (not shown), each of which has an actuator or servo mechanism 202 coupled thereto to re-position the controllable surface. Each servo mechanism 202 has a range of positional movement or duty cycle ranging from 0% (i.e., no movement) to 100% (i.e., the maximum amount of positional movement).

Control of servo mechanisms 202 is simplified in the present invention in the following fashion. Flight controller 70 need only generate a flight control signal that defines a percentage of positional movement for a particular one of servo mechanisms 202. That is, the flight control programmer does not need to know any absolute control values for the particular servo mechanisms onboard UAV 200. Flight controller 70 converts the percentage of positional movement to a digital address transmitted to a Field Programmable Gate Array (FPGA) 80. Along with this address is the identification of the particular servo mechanism 202 that is to be repositioned.

FPGA 80 is configured to define a look-up table 82, a number of input/output (I/O) ports 84 corresponding to the number of servo mechanisms 202, and a corresponding number of pulse width modulation (PWM) generators 86 that provide a PWM signal to an associated servo mechanism 202. Look-up table 82 uses the digital address indicative of the percentage of positional movement as a pointer. For example, if the address length is 8-bits or 256 possible values, each digital address is indicative of a unique percentage of positional movement resolved to approximately 0.4%. That is, a digital address of "0001" equates to approximately 0.4% of positional movement, a digital address of "0010" equates to approximately 0.8% of positional movement, etc.

Figure 2:
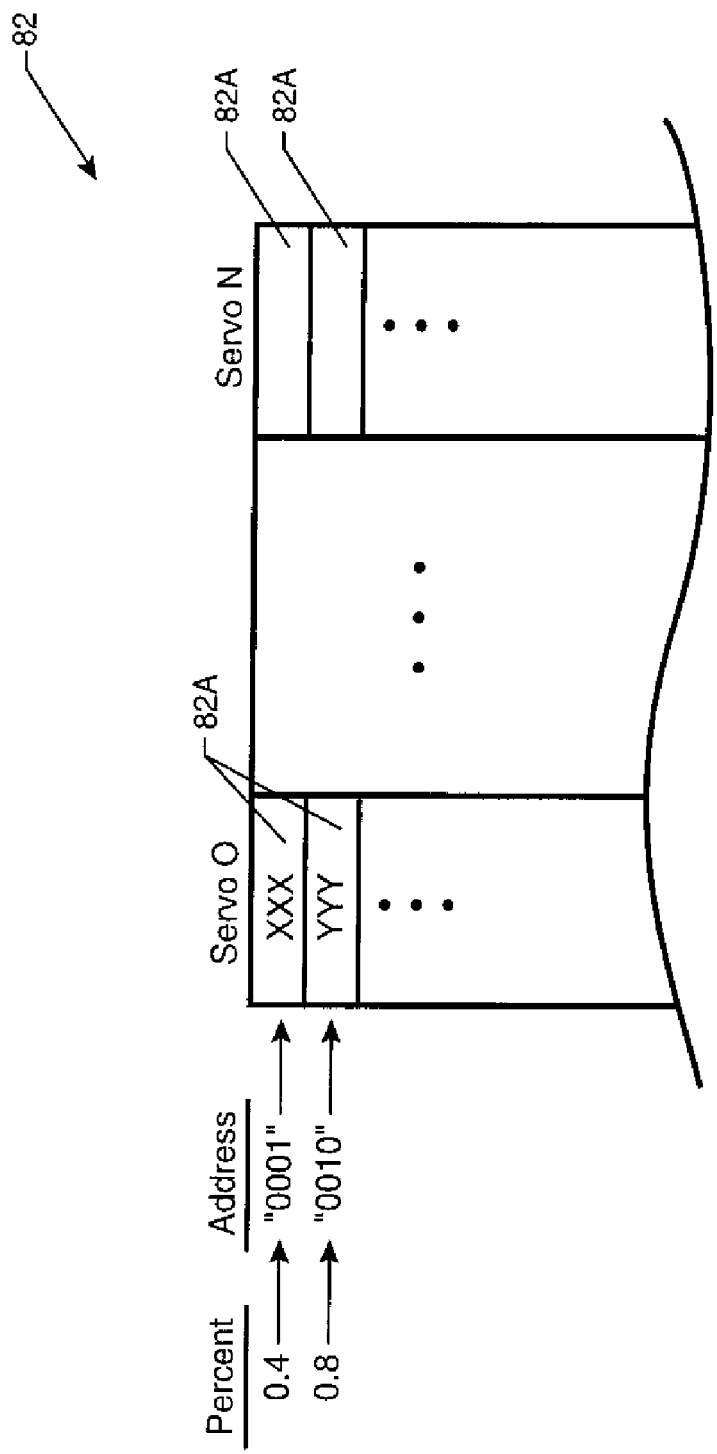
FIG. 2 is a pictorial representation of a look-up table storing servo mechanism control values in accordance with the present invention.

The digital address equated to a percentage of positional movement for one of servo mechanisms 202, as well as the identity of the particular servo mechanisms 202 that is to be repositioned, are passed to look-up table 82. Table 82 stores absolute control values for each of servo mechanisms 202. A pictorial representation of look-up table 82 is illustrated in FIG. 2 to aid in the understanding of the present invention. Storage locations 82A of look-up table 82 contain absolute control values (e.g., xxx, yyy, etc., for SERVO 0) for each of servo mechanisms 202. Thus, table 82 outputs an absolute control value stored at one of locations 82A. The absolute control value is provided to the appropriate one of servo mechanisms 202 as flight controller 70 addresses/strobes the corresponding one of I/O ports 84 via address lines 88. The absolute control value output from table 82 is thus passed to the appropriate PWM generator 86 to drive the corresponding servo mechanism 202 in accordance with the appropriate duty cycle.

The advantages of the present invention are numerous. Small UAVs can simply be designed to accommodate the self-contained avionics sensing and flight control system (i.e., circuit board(s)) of the present invention. Adaptation to a particular UAV and its servo mechanisms is made simply by updating the absolute values stored in the system's look-up table. The system can further be used for autonomous flight control by using sensor data in conjunction with provided flight plans, lists of way points, etc.

Although the invention has been described relative to a specific embodiment thereof, there are numerous variations and modifications that will be readily apparent to those skilled in the art in light of the above teachings. It is therefore to be understood that, within the scope of the appended claims, the invention may be practiced other than as specifically described.

What is claimed as new and desired to be secured by Letters Patent of the United States is:

1. An avionics sensing and flight control system, comprising:
    a first circuit board adapted to be mounted on an unmanned aerial vehicle (UAV);
    a first plurality of sensors mounted on said first circuit board for sensing a plurality of flight control parameters;
    a second plurality of sensors mounted on said first circuit board for sensing a plurality of surveillance parameters;
    a Global Positioning System (GPS) receiver mounted on said first circuit board for providing signals indicative of location;
    means, mounted on said first circuit board and coupled to said first and second plurality of sensors and said GPS receiver, for generating data packages with each of said data packages containing one of said flight control parameters, said surveillance parameters, and said signals indicative of location;
    a second circuit board adapted to be mounted on the UAV;
    a controller mounted on said second circuit board for processing ones of said data packages containing said flight control parameters and said signals indicative of location to generate flight control signals, and for storing ones of said data packages containing said surveillance parameters; and
    a Field Programmable Gate Array (FPGA) coupled to said controller and configured to provide
    (i) a look-up table storing sets of values with each of said sets being associated with a particular control surface's servo mechanism mounted on the UAV and with each of said values in each of said sets defining a unique absolute control value for the servo mechanism associated therewith, each of said values in each of said sets being indexed to a digital address in said look-up table that is indicative of a unique percentage of a maximum duty cycle for the servo mechanism associated therewith, and
    (ii) a plurality of pulse width modulation (PWM) generators coupled to said look-up table, each of said PWM generators being associated with and adapted to be coupled to one of the servo mechanisms, wherein each of said flight control signals specifies one said digital address in one of said sets and one of said PWM generators, and wherein said absolute control value stored at said one digital address is provided to said one of said PWM generators so-specified to thereby output a PWM signal to the servo mechanism associated with said one of said PWM generators.

2. An avionics and flight control system as in claim 1 wherein said first plurality of sensors comprises accelerometers, gyros, pressure sensors, and ultrasonic sensors.

3. An avionics and flight control system as in claim 2 wherein said pressure sensors comprise absolute and differential pressure sensors.

4. An avionics and flight control system as in claim 2 wherein said pressure sensors comprise micro-electro-mechanical systems (MEMS) devices.

5. An avionics and flight control system as in claim 2 wherein said gyros comprise a first gyro configured to measure pitch rate, a second gyro configured to measure roll rate, and a third gyro configured to measure yaw rate.

6. An avionics and flight control system as in claim 2 wherein said gyros comprise micro-electro-mechanical systems (MEMS) devices.

7. An avionics and flight control system as in claim 2 wherein said accelerometers comprise micro-electro-mechanical systems (MEMS) devices.

* * * * *